United States Patent [19]
Gill et al.

[11] Patent Number: 5,788,258
[45] Date of Patent: Aug. 4, 1998

[54] FOLDING BALL HITCH WITH RECESSED SAFETY CHAIN ATTACHMENT

[75] Inventors: George P. Gill; David L. Swanson; Donald R. Davidson, all of Rockford, Ill.

[73] Assignee: Atwood Industries, Inc., Rockford, Ill.

[21] Appl. No.: 752,528

[22] Filed: Nov. 20, 1996

[51] Int. Cl.$^6$ ............................................. B60D 1/54
[52] U.S. Cl. ........................ 280/491.1; 280/457; 280/901
[58] Field of Search ............................. 280/491.1, 491.3, 280/491.5, 457, 901

[56] References Cited

U.S. PATENT DOCUMENTS

| | | | |
|---|---|---|---|
| 3,125,355 | 3/1964 | Snuggins | 280/457 |
| 3,132,878 | 5/1964 | De Puydt et al. | 280/457 |
| 3,802,722 | 4/1974 | Sauber | 280/457 |
| 3,827,722 | 8/1974 | Miller et al. | 280/432 |
| 3,869,148 | 3/1975 | Iehl | 280/457 |
| 3,870,343 | 3/1975 | McGahee | 280/457 |
| 3,889,978 | 6/1975 | Kann | 280/415 B |
| 4,256,324 | 3/1981 | Hamilton | 280/433 |
| 4,540,194 | 9/1985 | Dane | 280/491 B |
| 5,145,199 | 9/1992 | Howard | 280/495 |
| 5,435,585 | 7/1995 | Chambers | 280/415.1 |
| 5,571,270 | 11/1996 | Larkin | 280/901 |

OTHER PUBLICATIONS

Buyers Products Company Advertisement.
Curt Manufacturing Inc. Advertisement.
DrawTite Advertisement.
Pro-Hitch Advertisement.
Reese Advertisement.
Wallace Forge Company Advertisement.
Shelton Industries Advertisement.
Quality S Advertisement.

*Primary Examiner*—Kevin Hurley
*Attorney, Agent, or Firm*—Leydig, Voit & Mayer Ltd.

[57] ABSTRACT

A folding ball hitch having a recessed safety chain latching mechanism is of the type normally mounted in the bed of a pickup truck. The ball is foldable from an upright or active position to a down or stowed position in which the ball does not interfere with the usage of the bed when the truck is not towing a trailer. To accommodate the safety chains of a trailer, the present invention provides a sliding rod mounted below the mounting plate of the hitch. Chain link sized slots are formed in the mounting plate. The end links of the safety chains can be inserted into the slots and the rod can be slid from one side to the other to securely lock the chains in respective slots. The rod is biased toward a latching position wherein the rod can be manually translated to open the slot for allowing insertion of a link of the safety chain, following which the rod can be returned to its center position in which the link is secured and any chain forces are transferred by the rod directly to the mounting structure. The safety chain mechanism is completely recessed (except when the bar operator is in the active position) to avoid obstruction of the truck bed.

17 Claims, 2 Drawing Sheets

5,788,258

FOLDING BALL HITCH WITH RECESSED SAFETY CHAIN ATTACHMENT

FIELD OF THE INVENTION

The present invention generally relates to hitches used for coupling a trailer to a towing vehicle, and more particularly relates to ball hitches having means for securing the safety chains of a trailer being towed.

BACKGROUND OF THE INVENTION

Certain types of trailers are connected to a towing vehicle by way of a ball hitch secured to the vehicle and a ball socket coupling mechanism on the trailer which mounts over the ball and thereby allows for the trailer to pivot behind the towing vehicle. The ball hitch is commonly mounted in the bed of a pickup truck near the longitudinal center line of the bed, so that the weight of the trailer is evenly distributed between the tires on the two sides of the pickup truck. This type of hitch is typically secured to the truck structure in an opening cut in the bed of the truck, so that a substantial portion of the hitch attachment is located below the bed of the truck. In addition, the ball typically may be removed or lowered to a stowed position below the bed to ensure that the use of the bed is not substantially hindered by the presence of the ball.

With many trailers, safety chains are provided as an added measure of safety to fasten the trailer to the truck and are required by many states. The safety chains may be secured between the trailer and an anchor in the truck to prevent the trailer from breaking away from the pickup truck in the event that the ball socket on the trailer uncouples from the ball. Early prior art devices, however, provide latching mechanisms for such safety chains which protrude above the level of the hitch and thereby hinder the efficient use of the truck bed even when the hitch is not being used.

One prior art safety chain anchor utilizes a pin which is secured to the periphery of a ring which is pivotally received in the hitch. The pin allows the ring to pivot between a vertical position in which the ring is capable of engaging a safety chain, and a horizontal or stowed position. While this type of folding anchor is feasible, it is somewhat expensive to manufacture and to incorporate into a hitch.

Another prior art anchor, disclosed in Chambers U.S. Pat. No. 5,435,585, utilizes a pair of links slidably mounted about pins within the links, the pins being welded to the underside of the mounting plate. When the links are not secured to a safety chain, gravity pulls the links downward through slots provided in the mounting plate to a recessed position below the upper surface of the mounting plate. However, when the safety chains are to be connected, a user can grasp the upper portion of the link, pull it upward out of the slot in the mounting plate, and connect the safety chain to the exposed portion of the link. While this type of anchor provides a relatively inexpensive means of securing the safety chains, it has a number of deficiencies. First of all, in order to expose a sufficient amount of the link for securing it to a safety chain, either the pin must be of relatively small diameter or the link of large internal diameter, or both. If the pin is made too small in diameter, it can become the weak link in the safety system. Secondly, the links are free to move on the pins, and this creates a "rattle" source, particularly in the stowed condition, where the links can simply vibrate and rattle in their unsecured position on the pins. A safety issue also arises in that the safety chain must be provided with an attachment means which can secure to the exposed portion of the link and can be expected to reliably remain so-secured even when the chain is not in tension. Normally the trailer is pulled with the hitch in place, and the safety chain is connected but unused. If the safety chain is to be of value, assurance must be had that the safety chain will stay connected to the link if the hitch fails. Thus the user must assure that whatever connection mechanism he provides on the end of the safety chain is of the type which will reliably be secured to the exposed portion of the link, will remain in place, and will stay in good repair so as to continue to perform those functions.

SUMMARY OF THE INVENTION

A general aim of the present invention is to provide a new and improved trailer hitch wherein the means for securing the safety chains of the trailer is provided with improved strength and reliability over the prior art devices, and is fully recessed below the surface of the mounting plate so as not to interfere with the usage of the truck bed.

Stated even more generally, an aim of the present invention is to provide a practical hidden safety chain anchor which is associated with and attached to the mounting plate of a folding ball hitch, with the anchor adapted to reliably and securely engage the links of the safety chain so that loads from the safety chain will be directly imposed on the mounting plate.

According to one aspect, an object of the present invention is to provide a safety chain anchor which can reliably be secured to the safety chain itself without the need for intermediate hooks or couplings which might be subject to failure.

According to a detailed aspect of the invention, it is an object to provide a safety chain anchor in which the moving parts are guided for movement, and which thus avoids the problems of rattle or vibration which attend to unsecured members.

An object of the invention is to provide a safety chain anchor which is positioned below the mounting plate of a folding ball hitch, and which takes full advantage of the strength of the mounting plate to directly secure the safety chain to the mounting plate.

According to a detailed aspect, it is an object to provide a safety chain anchor for a folding ball hitch in which the anchor mechanism is mounted entirely below the mounting plate of the folding ball hitch, and in which a recessed operator is readily brought into play for operating the mechanism below the mounting plate to secure the safety chain.

It is a feature of the invention to provide a hitch having a slidable rod disposed below a mounting plate of the hitch wherein a pair of slots are provided in the mounting plate for insertion of the safety chains. The rod can then be slid from one side to the other to secure and/or remove the safety chains when appropriate.

Another detailed feature of the present invention is to provide a hitch having U-shaped gussets secured to the underside of the mounting plate through which the rod passes when latched. The gussets provide additional side-load strength to the hitch in that the safety chains pull not only against the mounting plate and rod but against the sides of the gussets as well.

Another feature of the present invention is a ball hitch having a slidable rod disposed below the surface of the mounting plate and to which a lever is operably attached. The lever can be rotated to an upright position wherein a user can grasp the lever to slide it from one side to the other when it is desired to insert and/or remove the safety chains from respective slots provided in the mounting plate.

These and other objectives and advantages of the present invention will become more apparent from the following detailed description when taken in conjunction with the accompanying drawings.

Figure 1:
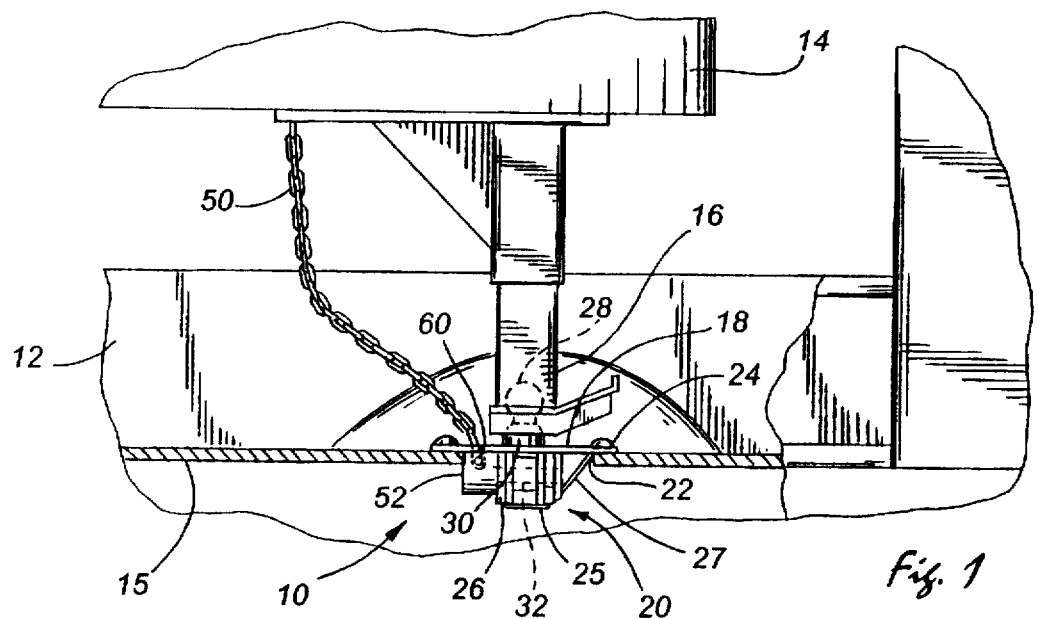
FIG. 1 is a side view of a typical folding ball hitch coupled to a gooseneck trailer and equipped with the new and improved safety chain anchors incorporating the unique features of the present invention.

While the invention is susceptible of various modifications and alternative constructions, a certain illustrated embodiment thereof has been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENT

Referring now to the drawings, and specifically to FIG. 1, hitch 10 is of the general type commonly employed in pickup trucks to tow trailers. Hitch 10 is disposed in bed 15 of pickup truck 12, and trailer 14 is pivotally mounted thereto. Trailer 14 includes a gooseneck socket coupling mechanism 16 adapted to releasably couple to ball 28 of hitch 10. Such an arrangement secures trailer 14 to pickup truck 12, and allows for pivoting of trailer 14 relative to truck 12. Safety chains 50 are provided for fastening of trailer 14 to truck 12 to maintain the connection between those vehicles in the event the coupling fails or disconnects.

Figure 2:
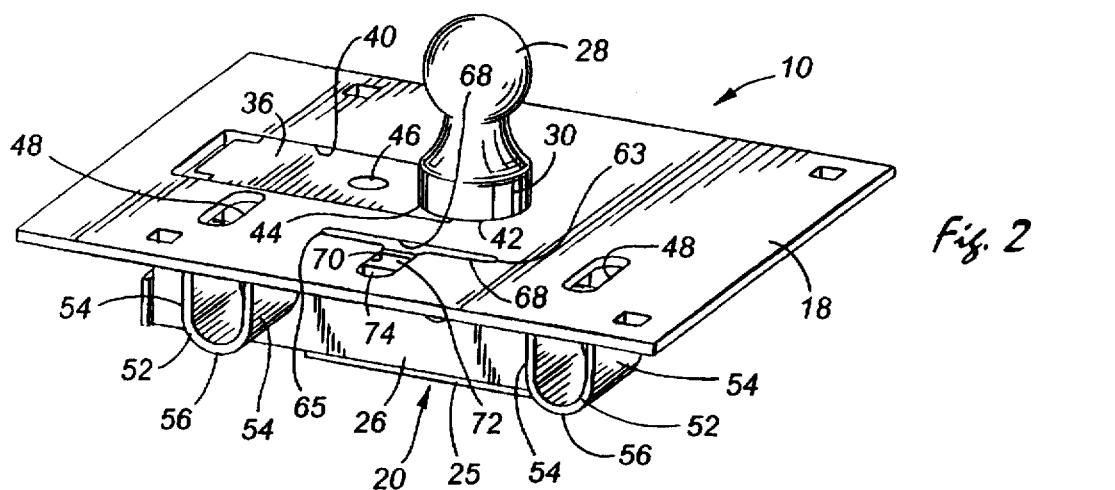
FIG. 2 is an enlarged perspective view of the hitch.

As best shown in FIG. 2, hitch 10 is based on mounting plate 18 to which a recessed support structure 20 is secured. As best shown in FIG. 1, recessed support 20 extends below the level of truck bed 15 through a bed aperture 22. Mounting plate 18 is secured to bed 13 via fasteners 24 such as conventional bolts, or alternatively may be welded in place.

Figure 6:
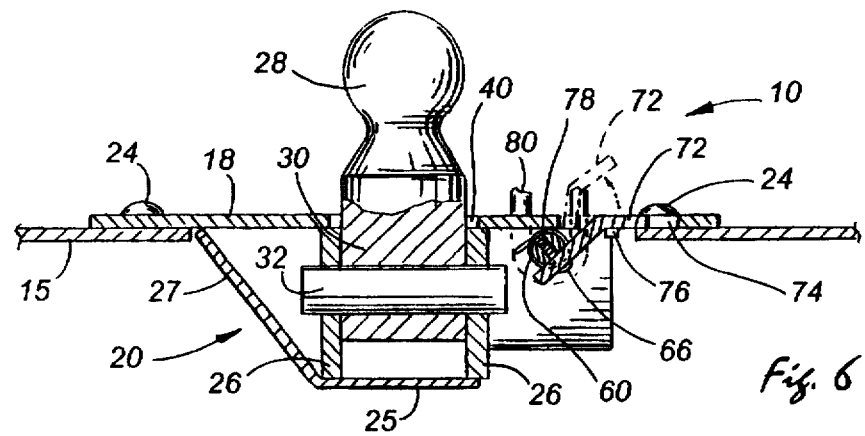
FIG. 6 is a sectional view of the present invention taken along line 6—6 of FIG. 4.

As perhaps best shown in FIG. 6, the recessed support 20 includes a pair of parallel plates 26 which are secured as by welding to the mounting plate 18. The support structure also includes a gusset plate 25 which is secured as by welding to the lower ends of the parallel plates 26 and has an angled gusset portion 27 which is welded to the underside of the mounting plate 18. In prior structures, the gusset plate had been V-shaped and had extended both forwardly and rearwardly. However, as will be described, in the present structure elements which form a portion of the safety chain latch are also used as gussets to rigidify the recessed ball support.

The ball member itself is secured in the recessed support structure and supported primarily by the parallel side plates 26. It will be seen that a pivot pin 32 projects through apertures in the side plates and through an aperture in the shank 30 of the ball 28. The pivoted arrangement allows to the ball to be transferred from the active upright position shown in the figures to a down-lying position in which the ball is entirely between the side plates 26 and below the upper surface of the mounting plate 18. It will be seen that the shank portion 30 of the ball closely fits between the parallel plates 26. Recalling the orientation of the arrangement (see FIG. 1), it will be seen that forward or rearward forces on the ball, will be transferred to the parallel plates 26 which themselves are firmly supported in right angle relationship from the bottom of the mounting plate 18 so as to take the loads normally encountered in towing. It will also be seen (from FIG. 2) that a top plate 36 has a closely conforming arcuate surface which mates with the ball on one half of its periphery, while the ball mates with a closely conforming circular aperture in the mounting plate 18 at the other half of its periphery, so that the upper portion of the ball is also adequately supported with respect to side loads.

In greater detail, as shown in FIG. 2, mounting plate 18 includes cover slot 40 into which ball cover 36 folds. Cover slot 40 includes semi-circular slot end 42 which matches the curvature of shank 30, and cover 36 includes semi-circular cover end 44 which also matches the curvature of shank 30. Therefore when ball 28 and shank 30 are moved to the upright or active position, semi-circular slot end 42 and semi-circular cover end 44 cooperate to lock shank 30 in place. Hole 46 is provided in cover 36 as a means for grasping and raising cover 36.

Figure 3:
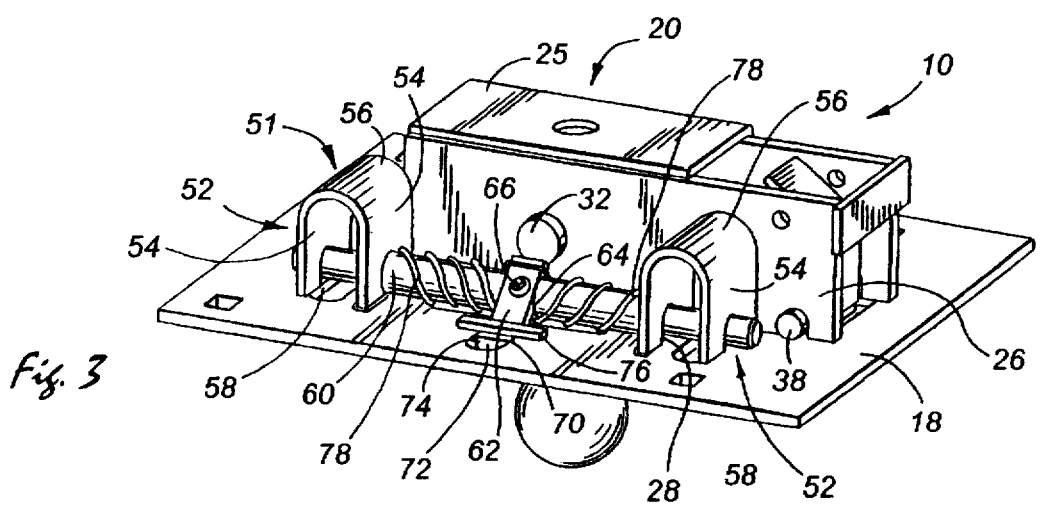
FIG. 3 is an enlarged perspective view of the underside of the hitch.
Figure 5:
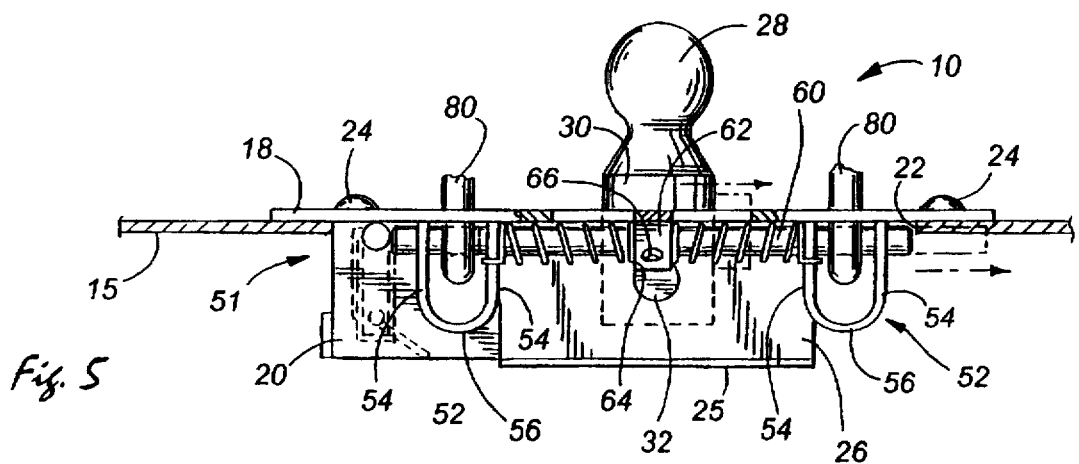
FIG. 5 is a sectional view of the present invention taken along line 5—5 of FIG. 4.

In carrying out the present invention, mounting plate 18 is provided with a pair of elongate chain slots 48 which are sized to receive the end links of safety chains 50. As best shown in FIGS. 1 and 5, a safety chain bolt arrangement 51 is associated with the chain slots 48 to provide a means for selectively connecting or disconnecting the end links 80 of the safety chain to or from the mounting plate 18. In the illustrated embodiment, the safety chain bolt arrangement 51 includes a slidable rod or bolt 60 associated with bolt guides generally indicated at 52. The bolt guides have apertures 58 through which the bolt 60 passes, and arranged on either side of each slot 48. The bolt has a manual operator 62 affixed thereto which can be manipulated to cause translation of the bolt along its axis so as to open or close the chain slots 48. FIG. 3 illustrates the situation with both chain slot guides closed, in which the bolt 60 is supported on the mounting plate on both sides of both slots. When the unit is in the standard locked orientation shown in FIG. 1, and with both chain slot guides closed, if a load is imposed along chain 50, such as if the coupling mechanism comes free while the trailer is being towed, the chain load 50 will cause the link to load the bolt directly against the mounting plate. Due to the relative thickness of the bolt, (the bolt is preferably thicker than the thickness of the chain elements), and the fact that the bolt either bears directly against the mounting plate (see FIG. 3) or if supported a distance from the mounting plate bears through the bolt guides to the mounting plate, the forces will be directly transferred from the chain to the bolt to the mounting structure, and will likely be absorbed without releasing the trailer. In this case the mounting structure which bears the load is intended to encompass not only the mounting plate itself, but also the gussets and parallel plates which form the housing for the ball. The elements, as will now be apparent, are rigidly welded together to form an interrelated structure which will absorb the loads. The robustness of the structure is emphasized by the fact that the loads which must be sustained by the typical safety chain latch are on the order of 25,000 lbs. per chain.

In the preferred practice of the invention, the bolt guides perform the dual function of guiding the bolt 60 and also supporting the housing 20 which carries the ball 28. Thus, the bolt guides are secured, as by welding, to both the lower surface of the mounting plate 18, and also to the vertical surface of one of the walls 26. Thus, the bolt guides serve as gussets to rigidify the bolt housing 20. It will be recalled (see FIG. 6) that the plate 25 is secured as by welding to both the lower surfaces of the parallel plates 26, and also, at the end of angled portion 27, to the lower surface of mounting plate 18. Thus, the angled portion 27 serves a gusset function. On the other side, with respect to the right hand wall 26 (as shown in FIG. 6), the bolt guide, being fixed both the lower surface of the mounting plate, and to the upstanding surface of the plate 26 also serve a gusset function, and thus serve to maintain the right angle rigidity of the housing 20.

In the most preferred practice of the invention, the bolt guides, which also serve the gusset function, are formed in the shape of yoke-like members (see FIG. 3) having vertically disposed arms 54 joined by an arcuate connector 56 which is at the lowest portion of the yoke in the normal orientation of FIG. 1. The length of the arms and the arrangement of the arcuate connector 56 is such that a chain link, when inserted through a chain slot 48, would tend to bottom on the arcuate portion 56, holding the link in proper position for passage of the bolt through the center of the link to achieve the locked condition. This can be appreciated with reference, for example, to FIG. 5, which shows links 80 in their locked orientation. In order to achieve the locked orientation, the links would be allowed to enter the slots to a slightly greater extent, until the bottom of the link bottoms on the arcuate portion 56, or the cross link stops on the top of plate 18 following which the bolt would be translated so that it enters the link for support on the opposite surface of the guide plate, thereby completing the locking operation.

In order to move rod 60 through apertures 58 and thereby allow safety chains 50 to be secured and/or released, an operating lever 62 is secured to rod 60. Rod 60 preferably includes a rectangular flat 64 which receives lever 62 as best shown in FIG. 3. The operator is secured in position against the flat by means of fastener 66. In the preferred embodiment, fastener 66 is a conventional screw, although other fastening means or methods are certainly possible. As best shown in FIG. 6, lever 62 can be rotated upward as shown in phantom lines. Lever 62 can then be slid along lever slot 68 (FIG. 2). By moving lever 62 to end 63 of lever slot 68, rod 60 will be moved to the position shown in phantom in FIG. 5, such that rod 60 protrudes substantially through one bolt guide 52 while engaging only one side 54 of the other bolt guide 52. This therefore allows chain link 80 to be inserted through or removed from the open chain slot 48. Similarly, when lever 62 is slid to end 65 of lever slot 68, rod 60 will substantially protrude through the other bolt guide 52 and thereby allow chain link 80 to be removed from or inserted through the other chain slot 48.

It is preferred to use the operation just described in which the central position of the operator 62 locks both safety chains in position, and the operator must be moved in one direction to release or engage one safety chain, and in the opposite direction to release or engage the other. In this way, one of the chains can remain in position, and the operator need concentrate on only one chain at a time. Once the first chain is locked in position, the operator need give it no further attention as he attends to locking the other chain into position, since the bolt arrangement will release or open only one bolt guide at a time.

Other arrangements, of course, are possible. Indeed, a bolt can be configured of a two piece structure with an operator positioned clear of the bolt guides, so that both chain apertures can be opened at the same time. For example, the bolt can be configured in a modified U-shaped arrangement, with ends of a U-shape both projecting in the same direction through a pair of apertures, so that both bolt ends move to open the apertures when the operator is slid in one direction and both move to close the apertures when the operator is moved in the other direction. Even in this configuration, it may be preferable to make one bolt end longer than the other, so as to allow one bolt to be secured in place around its safety chain following which the operator can then individually give attention to the second bolt. In its broadest aspects, the present invention is intended to encompass all such arrangements. However, as noted above, in its most preferred form, the arrangement provides maximum safety and a maximum degree of fool-proofness, by operating only one chain slot at a time.

Figure 4:
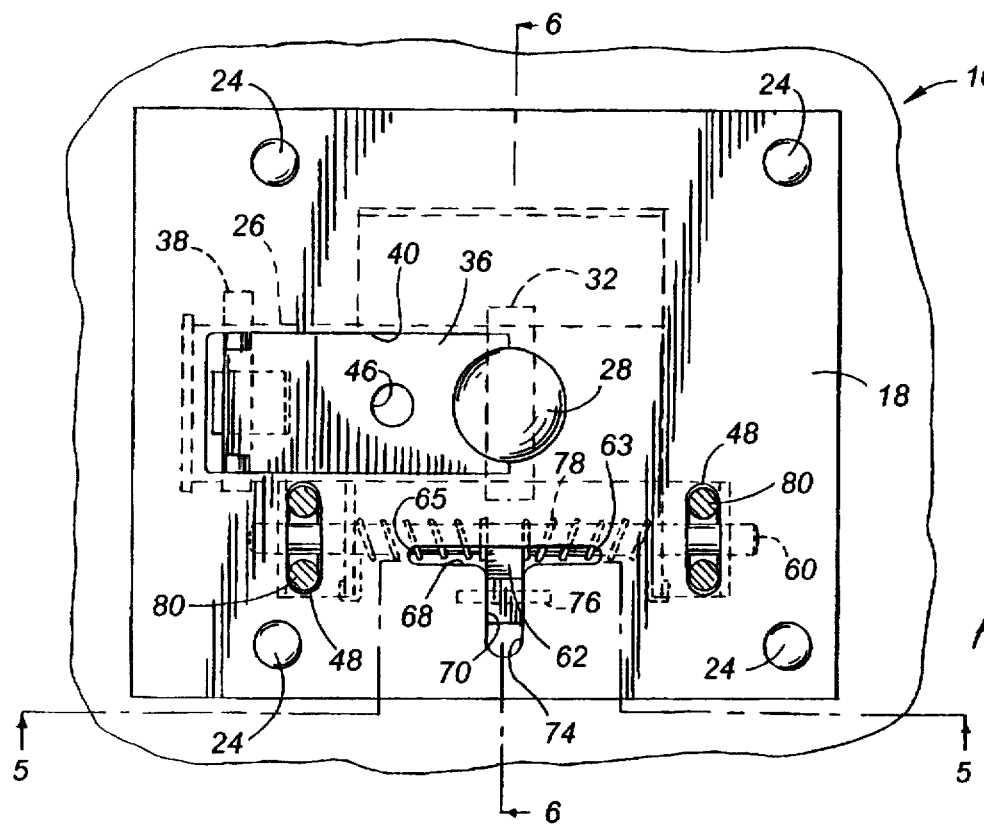
FIG. 4 is a top view of the present invention.

Thus, in the preferred form, the operator 62 is restrained for movement in a T-shaped slot (see FIGS. 2 and 4). The upright portion or stem of the T allows the operator to be pivoted downwardly so that the entire operator is below the upper surface of the mounting plate when in their normal inactive position (see FIG. 2). However, as suggested in FIG. 6, the operator can be rotated so that it moves upwardly in the stem portion of the T, so that it is then free to enter either the left or right arms of the T-slot 68. When moved to the left, the right hand chain slot can be manipulated, and when the operating bar is moved into the right hand arm of the T, the right hand chain slot remains locked, while the left hand chain slot can be manipulated.

It is preferred to provide spring bias for the operating rod in order to further assure that the links, when locked into position, remain locked. In order to bias rod 60 into a central position as best shown in FIG. 5 wherein rod 60 protrudes through both bolt guides 52 and both sides 54 of each bolt guide 52, springs 78 are tensioned around the outer circumference of rod 60. It will be seen in FIG. 5 that the ends of the spring are tensioned around the bolt guides 52 so as to provide a rotational force on the bolt 60 which tends to rotate it such that the operator 72 is biased into its recessed position. It is noted that a stop 76 is provided in the form of a bar welded across the T-slot, to provide a lower position for the operator. The springs tend to load the operator in this direction. Also, it will be seen that as the bolt is slid to either its left or right position, the spring on one side or the other will tend to compress, and will bias the rod back to its central position, when the operator releases the operating lever. Thus, if the spring is sufficiently stiff, when the operator releases the rod, the rod will be biased back to the central position, and then the operator will be rotated back into the recessed position in the slot. The springs also are of significant assistance in returning the rod to its normal position even when the operator is manually manipulating it in both directions. The spring is not so strong, however, as to provide significant resistance when the operator decides to grasp the end of the operating lever 72, rotate it so that the operating lever enters the cross bar of the T-slot, and translate it either left or right for purposes of inserting or removing a chain link.

In order to ensure the central position shown in FIG. 5 during towing operation of hitch 10, mounting plate 18 is provided with locking notch 70 shaped to receive handle portion 72 of lever 62 as best shown in FIG. 2. Therefore when rod 60 is in the central position, lever 62 can be rotated such that handle portion 72 inserts into locking notch 70 and is in coplanar or flush relationship with mounting plate 18. Locking notch 70 also includes recess 74 to facilitate grasping of handle portion 72 when it is in the locked position. To ensure handle portion 72 does not rotate through mounting plate 18, backstop 76 is provided on the underside of mounting plate 18 as best shown in FIG. 3. In the preferred embodiment, backstop 76 is disposed transverse to locking notch 70 and is welded to the underside of mounting plate 18, although other fastening means are certainly possible.

In operation, hitch 10 is provided in bed 13 of truck 12 such that trailer 14 can be coupled thereto. When it is desired to fasten trailer 14 to truck 12, cover 36 is grasped via handle hole 46 and pulled upward away from mounting plate 18 to reveal ball 28 and shank 30 folded into recessed support 20. The user then grasps and pivots ball 28 about pivot pin 32 to the upright or active position shown in FIG. 2. Cover 36 is then folded back down into coplanar relationship with mounting plate 18. Socket coupling 16 of trailer 14 is then mounted onto ball 28 of hitch 10 in a conventional manner.

To provide added fastening security, trailer 14 is provided with safety chains 50 which can be inserted into chain slots 48 provided in mounting plate 18. Chain links 80 of safety chains 50 are adapted to protrude through chain slots 48 and to be secured in position via rod 60 passing through the inner periphery of chain link 80. To provide for the insertion and/or removal of chains 50, rod 60 is slidably mounted between U-shaped gussets 52.

Safety chains 50 are inserted into chain slots 48 one at a time. To insert one safety chain 50, rod 60 is slid to either end 63 or end 65 of lever slot 68 as shown in phantom lines in FIG. 5, to thereby prevent rod 60 from traversing through the other gusset 52. One safety chain 50 can then be inserted into the open gusset 52 and rod 60 can then be slid to the other end of lever slot 68 to not only pass rod 60 through the inner periphery of the inserted chain link 80 but also to open the other gusset 52 for insertion of the other chain link 80. Springs 78 then bias rod 60 to the central position shown in FIG. 5 such that rod 60 protrudes through the inner peripheries of both chain links 80.

Once chains 50 are inserted into chain slots 48, and springs 78 bias rod 60 to the central position, lever 62 can be folded down such that handle portion 72 is in coplanar relationship with mounting plate 18. Mounting plate 18 is provided with locking notch 70 to receive handle portion 72 and prevent lateral movement of lever 62, and accordingly rod 60.

With conventional ball hitches, the efficient usage of truck bed 13 is limited by the upward protrusion of the elements of hitch 10 even when hitch 10 is not being used. The present invention therefore provides a means of recessing all the working components of hitch 10 when not in use. As described above, ball 28 and shank 30 pivot about pin 32 and can be folded into recessed support 20 and covered with cover 36. Cover 36 is foldable into flush relationship with mounting plate 18 to thereby prevent any portion of ball 28 and shank 30 from protruding above mounting plate 18 and interfering with the efficient usage of bed 13. Since rod 60 is mounted below mounting plate 18 and the means for securing chains 50 to hitch 10 are entirely provided below the surface of mounting plate 18, the safety chain linkage mechanisms also do not interfere with the efficient usage of truck bed 13. Since mounting plate 18 includes locking notch 70 and lever slot 68, rod 60 is able to be manipulated from end 63 to end 65 of lever slot 68 while not interfering with the efficient usage of truck bed 13. Furthermore, it will be appreciated that none of the elements are sufficiently loose to rattle, so that when the hitch is not in use, it is not only visually unobtrusive below the plane of the bed, but also it is audibly unobtrusive.

Not only does the present invention provide for a means of recessing hitch 10 into bed 13 of truck 12, but the present invention also provides for a very robust means for securing chains 50 to truck 12. Chains 50 are supported not only by rod 60, but by sides 54 of brackets 52, and mounting plate 18 as well. This provides additional strength to withstand the side loads placed on safety chains 50 as truck 12 and trailer 14 traverse a given path. It should also be appreciated that these advantages are provided in a very economical fashion. Typically, a gusset arrangement will be required on both of the parallel plates 26 in order to support the ball arrangement. In this case one set of gusset plates serve also as the means for mounting and guiding the locking rod. The locking rod is a very simple mechanism, in the form of a bolt, spring-loaded in the preferred embodiment, which in its normal condition simply overlies both chain slots. When the yoke-shape ball guides are used, it is preferred to simply form slots in the ends of the bolt guides, so that the bolt guides are simply clamped over the rod and held in place as the arrangement is welded together. The parts count and the number of operations needed to form a complete hitch assembly are not significantly greater than those associated with a hitch without the safety chain feature.

From the foregoing, it will be apparent that the present invention brings to the art a new and improved folding ball hitch 10 in which safety chains 50 can be securely mounted. Given the recessed nature of rod 60 as well as gussets 52 and lever 62, hitch 10 will not interfere with the efficient usage of truck bed 13 when hitch 10 is not being used. Moreover, given the design of gussets 52, hitch 10 provides improved holding strength over the prior art. Finally, with the preferred form of central lock for enhanced safety is provided by allowing the operator to focus on locking one chain at a time, while maintaining the already locked chain in position while he focuses on attaching the second chain.

What is claimed is:

1. A hitch adapted to be mounted to a vehicle for releasably interlocking with a coupling mechanism of a trailer having at least one safety chain, said hitch comprising:

a mounting structure including a mounting plate having an upper and a lower surface and adapted to be secured to the vehicle, at least one elongate chain slot in the mounting plate of a size sufficient to allow passage of a link of the safety chain through the mounting plate;

a ball mounted on the support for movement between an upright active position and a generally horizontal stowed position, the ball projecting above the upper surface to releasably interlock with the coupling mechanism when the ball is in the upright position, the ball being located below the upper surface when the ball is in the stowed position;

a safety chain lock rod in the mounting structure and slidably mounted to the lower surface of the mounting plate, the rod being positioned transverse to the chain slot and slidable between an unlocked position in which the chain slot is free to receive a link, and a locked position in which a chain in the slot is engaged by the rod while the rod bears against both sides of the slot; and an operator for manually positioning the rod between latched and unlatched positions to receive and lock or to unlock and remove the safety chain.

2. The hitch of claim 1, wherein the trailer includes two safety chains and said mounting plate has two elongate chain slots, said chain slots being aligned such that the rod in the locked position closes both said slots, whereby the operator is adapted to manually position the rod to insert and lock an end link from each safety chain.

3. The hitch of claim 2 wherein the operator is connected to the rod for manually positioning the rod to sequentially open the respective slots to lock a first one then the other of said safety chains in position.

4. The hitch of claim 2 including a pair of bolt guides secured to the lower surface of the mounting plate at the respective chain slots for securing the rod to the bottom side of the mounting plate, the bolt guides having apertures engaging the rod and positioned on both sides of each chain slot, the bolt guides being positioned so that any loads imposed on the chain by the trailer are transferred by the bolt to the mounting structure.

5. The hitch of claim 4 in which the ball is pivotally mounted in a housing secured to the underside of the mounting plate, and said bolt guides comprise gussets secured to the mounting plate and to an upstanding wall of the housing for reinforcement thereof.

6. The hitch of claim 4 in which each bolt guide comprises a U-shaped yoke having a pair of apertures in respective arms of the yoke for slidably receiving the bolt, the depth of the U-shaped yoke being sufficient to engage a link of a safety chain for support thereof while positioning the rod to engage said link to achieve the locked condition.

7. The hitch of claim 6 in which the apertures in the respective yokes comprise open ended slots formed at the ends of arms of the yoke and of a size adequate to slidably receive the bolt, whereby securing of the yokes to the mounting plate fixes the bolt to ride directly against the lower surface of the mounting plate for transferring safety chain forces directly to said mounting plate and structure.

8. The hitch of claim 7 wherein the operator comprises a lever affixed to the bolt and positioned in a T-slot formed in the mounting plate, the stem of the T-slot allowing the lever to be pivoted to an inactive position substantially below the upper surface of the plate in the locked position, the arms of the T-slot allowing translation of the bolt between the locked to the unlocked position.

9. The hitch of claim 8 wherein each arm of the T-slot is associated with the locked or unlocked condition of one of the chain slots, whereby translation of the operator in one direction serves to lock or unlock a first one of the chain slots while the other remains locked, and translation of the lever in the other direction serves to lock or unlock the other chain slot while the first remains locked.

10. The hitch of claim 9 further including spring means for biasing the rod to a central position in which both safety chains are locked.

11. A hitch adapted to be mounted to a vehicle for releasably interlocking with a coupling mechanism of a trailer having safety chains, said hitch comprising:
a mounting plate having an upper and lower surface and adapted to be secured to the vehicle;
a ball pivotally mounted in a housing secured to the lower surface of the mounting plate and adapted to be pivoted between a lowered position below the surface of the mounting plate and a raised position in which the ball projects upwardly for securing to the coupling mechanism;
a safety chain lock or attachment comprising a pair of elongate slots in the mounting plate and a bolt secured below the mounting plate and adapted for axial translation between a locked position in which the bolt overlies both said slots and an unlocked condition in which the slots are controllably opened for receiving a link of a safety chain; and
bolt guide means comprising apertured bolt guides affixed to the lower side of the plate on either side of each slot, at least some of said bolt guides having up-standing surfaces engaging the housing and secured to the housing to serve as gussets supporting the housing and thereby the ball.

12. A folding ball hitch adapted to be secured to a truck bed for releasably securing a trailer thereto, said trailer including a socket to receive said ball hitch and a pair of safety chains to be secured to said truck bed, said hitch comprising:
a mounting plate having upper and lower surfaces and adapted to be secured over an opening in the truck bed;
a ball support secured to the lower surface of the mounting plate;
a ball pivotally mounted to the ball support and movable between an upright active position wherein the ball latch protrudes above the mounting plate and an inactive position wherein the ball is stowed below the upper surface of the mounting plate;
a pair of elongate chain slots in the mounting plate and of a size adequate to allow passage of an end link of the safety chain through the slot;
a pair of apertured bolt guides attached to the lower surface of the mounting plate at the chain slots and having axially aligned apertures;
a locking rod slidably mounted in the axially aligned apertures and reciprocative between locked and unlocked positions with respect to the chain slots, in the locked position the rod being supported on both sides of the chain slots for closing said slots, and in the unlocked position the rod being withdrawn to one side of the chain slot for opening same;
a manually accessible operator attached to the rod for translating the rod between the locked and unlocked positions; and
means for biasing said rod to a central position in which said rod protrudes through both said mounting brackets, whereby the safety chains can be inserted through said chain slots and said rod can be moved between said locked and said unlocked positions to allow said rod to engage or release said chains.

13. The folding ball hitch of claim 12, wherein the operator is positioned in a T-shaped slot formed in the mounting plate, the stem of the T allowing the operator to be pivoted to a position substantially below the upper surface of the mounting plate, the arms of the T allowing the operator to reciprocate the bolt in a selected direction to selectively control the opening of the respective chain slots.

14. The folding ball hitch of claim 13 further including means for biasing the rod to a central position with the operator located at the stem of the T so as to lock both chains slots.

15. The folding ball hitch of claim 12 wherein the apertured bolt guides comprise gussets secured to both the lower surface of the mounting plate and the ball support so as to both secure the bolt and rigidify the ball support.

16. The folding ball hitch of claim 15 wherein each aperatured bolt guide comprises a U-shaped yoke having apertures in the arms of the U for receiving the bolt, the U having a bridge joining the arms and disposed below the mounting plate by a sufficient distance to serve as a stop for a link being locked in the chain slot.

17. The folding ball hitch of claim 16 in which the apertures in the yoke comprise slots at the ends of the respective arms of the yoke of a size adequate to receive said bolt, whereby securing of the yokes to the lower side of the mounting plate serves to mount the bolt in contact with the lower surface of the mounting plate, so that chain loads are transferred through the bolt directly to the mounting plate.

* * * * *